United States Patent [19]

Staerzl

[11] 4,377,997

[45] Mar. 29, 1983

[54] IGNITION TIMING AND DETONATION CONTROLLER FOR INTERNAL COMBUSTION ENGINE IGNITION SYSTEM

[75] Inventor: Richard E. Staerzl, Fond du Lac, Wis.

[73] Assignee: Brunswick Corporation, Skokie, Ill.

[21] Appl. No.: 83,839

[22] Filed: Oct. 11, 1979

[51] Int. Cl.³ .............................................. F02P 5/04
[52] U.S. Cl. .................................. 123/418; 123/425; 123/602
[58] Field of Search ................ 123/599, 602, 418, 425

[56] References Cited

U.S. PATENT DOCUMENTS

| | | | |
|---|---|---|---|
| 3,952,715 | 4/1976 | Van Siclen, Jr. ................... | 123/602 |
| 4,120,272 | 10/1978 | Douaud et al. ..................... | 123/425 |
| 4,170,207 | 10/1979 | Boyama ............................... | 123/602 |
| 4,244,336 | 1/1981 | Fitzner ............................ | 123/602 X |

Primary Examiner—Tony M. Argenbright

[57] ABSTRACT

An internal combustion engine employs an alternator driven capacitor dishcarge ignition system wherein a stator coil assembly provides power pulses to charge the capacitors and an adjustably positionable coil assembly provides electrical pulses whose frequency and magnitude (bias voltage) are related to engine speed and effect ignition timing i.e., capacitor discharge. An electronic solid state ignition timing and detonation controller is connected to the capacitor discharge ignition system and operates in response to the pulses from the high speed winding of the aforesaid stator coil assembly to supply a bias signal which reduces the aforesaid bias voltage from the said other coil assembly at higher engine speeds thereby providing additional spark advance, depending upon engine speed and detonation severity. The electronic controller improves engine efficiency at cruising speeds and reduces detonation at high speeds.

10 Claims, 8 Drawing Figures

IGNITION TIMING AND DETONATION CONTROLLER FOR INTERNAL COMBUSTION ENGINE IGNITION SYSTEM

BACKGROUND OF THE INVENTION

1. Field of Use

This invention relates generally to alternator driven capacitor discharge ignition systems for internal combustion engines. In particular it relates to an electronic ignition timing and detonation controller for use with such ignition systems to improve engine efficiency by providing additional spark advance in response to engine speed and detonation levels.

2. Description of the Prior Art

As U.S. Pat. No. 3,937,200 (owned by assignee of the present application) shows, some engines, such as multi-cylinder outboard motors, employ alternator driven capacitor discharge ignition systems wherein the alternator includes charging coils for charging the capacitor and a trigger coil to control ignition timing, i.e., time of spark plug firing. In some such systems, the trigger coil produces electrical pulses whose frequency and magnitude (voltage level or bias) are both proportional to engine speed, increasing or decreasing therewith, and both signal characteristics are used for timing. Typically, advance or retard of firing timing to obtain improved engine performance at various engine speeds is accomplished by adjustably positioning the trigger coil by means of a mechanical linkage in response to the position or movement of the engine throttle lever which controls engine speed. For example, with the throttle lever in engine-start position, the trigger coil is in retard position so that spark plug firing occurs after a piston reaches top dead center (TDC). Similarly, when the throttle lever is moved to increase engine speed, the trigger coil is moved to an advance position so that spark plug firing occurs before a piston reaches top dead center (TDC),

SUMMARY OF THE PRESENT INVENTION

The present invention provides an improved solid state type electronic ignition timing and detonation controller for use with alternator driven capacitor discharge ignition systems of internal combustion engines, such as large multi-cylinder outboard motors. The controller is usable with ignition systems of a type which employ a charging coil assembly to supply power pulses to charge the capacitors and employ a trigger coil assembly to produce electrical pulses whose frequency and magnitude (voltage level or bias) are proportional to engine speed and are used to control ignition timing, as distinguished from systems wherein trigger coil bias is not utilized.

The controller provides and adjustably controls additional spark advance in response to increased engine speed and in response to detonation levels, thereby improving engine efficiency at cruise speeds and ensuring proper operation at high speeds where detonation is likely to occur.

The controller comprises a signal conditioner circuit for receiving and conditioning the electrical pulses from a high speed winding of the charging coil assembly; a phase shifter circuit for phase shifting the conditioned pulses received from the signal conditioner; an advance timer circuit and a retard timer circuit, each of which receives phase shifted pulses from the phase shifter circuit and determines whether and to what extent advance or retard is required; a control gate responsive to the outputs of the timer circuits to operate an ignition bias control circuit which provides a bias signal to modify the bias otherwise provided to the ignition timing circuit by the trigger coil; and a detonation sensing circuit connected to the ignition bias control circuit to modify the bias signal produced thereby in response to engine detonation.

The two timer circuits are triggered by pulses representative of engine speed and supplied from the high speed winding of the charging coil assembly of the engine. Spark advance is initiated when the duty cycle (pulse width of the output signal) of the advance timer circuit is equal to the period (inverse of the frequency) of the trigger signal. Spark advance is then proportional to engine speed until the duty cycle (pulse width of the output signal) of the advance timer circuit is, for example, double the period of the trigger signal, whereupon maximum spark advance is reached. A further increase in engine speed produces no change in spark timing until the duty cycle (pulse width of the output signal) of the retard timer circuit is equal to the period (inverse of the frequency) of the trigger signal. From this point, an increase in engine speed produces a proportional decrease in spark advance until the duty cycle of the retard timer circuit is double that of the period of the trigger signal. The spark timing will now be back to where spark advance was initiated. A further increase in engine speed produces no further change in spark timing.

The detonation sensing circuit proportionally reduces the spark advance towards the initial timing; the amount of reduction varying directly with the amplitude of detonation. The detonation sensing circuit incorporates a filter to maintain proper timing and low detonation levels. In order to inhibit high speed mechanical noise from actuating the detonation sensing circuit, a signal from the retard timer circuit is fed into the ignition bias control circuit to gradually increase the threshold voltage needed from the detonation sensing circuit to render the latter effective.

A controller in accordance with the invention offers several advantages over the prior art. The controller takes the form of a small compact low cost economically manufacturable reliable solid state electronic device. The controller provides a wider range and more sophisticated stable form of spark advance/retard control and couples this with improved detonation control.

Other objects and advantages of the invention will hereinafter appear.

DESCRIPTION OF A PREFERRED EMBODIMENT

Figure 1:
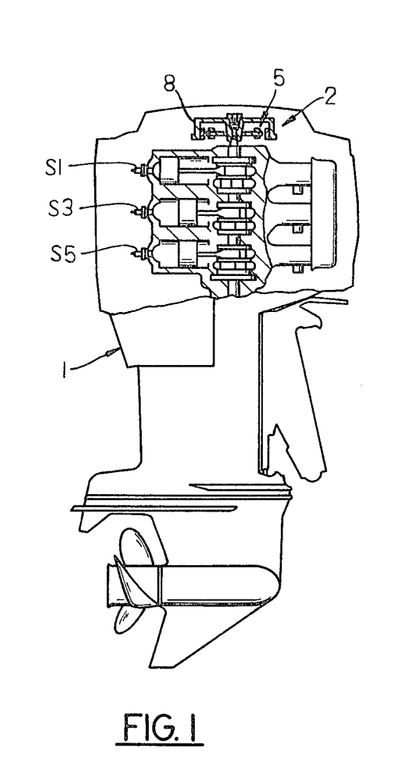
FIG. 1 is a side elevational view of an internal combustion engine, in the form of an outboard motor, with which an ignition system and controller in accordance with the present invention is advantageously employed.
Figure 2:
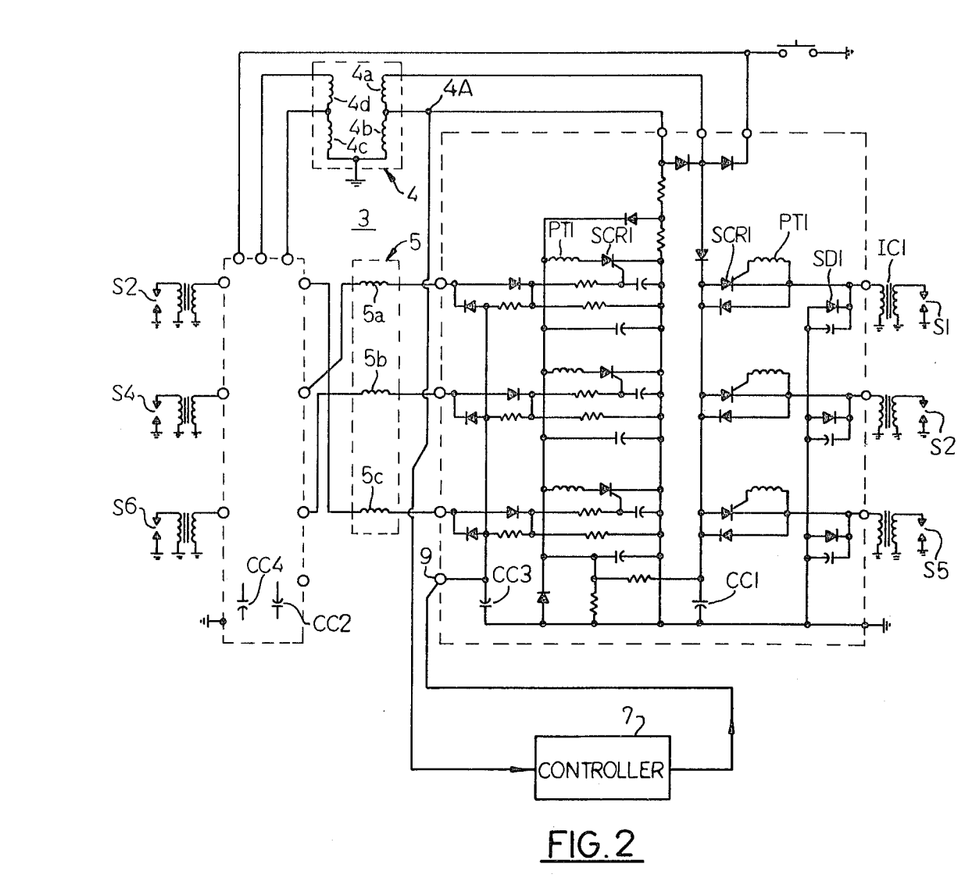
FIG. 2 is a partial electric circuit diagram of the ignition system for the engine of FIG. 1, and shows a controller in accordance with the invention connected thereto.

Referring to FIGS. 1 and 2, numeral 1 designates an internal combustion engine, in the form of a large V-6 outboard motor having six cylinders and six spark plugs S1 through S6 therefor. Enginge 1 is provided with an alternator 2 and an alternator driven capacitor discharge ignition system 3, shown in schematic and diagrammatic form in FIG. 2. Alternator 2 and ignition system 3 are generally constructed and operate in a manner generally similar to the detonation and ignition system shown in U.S. Pat. No. 3,937,200 which employs an adjustably movable trigger coil to effect spark advance/retard, except that the latter ignition system supplies a two-cylinder engine.

Referring to FIGS. 1 and 2, alternator 2 comprises a charging coil assembly 4 and trigger coil assembly 5 which are understood to be mounted within the alternator and the coils thereof are caused to emit electrical pulses by means of a rotatable magnet 6 which is part of the alternator and which is located on and rotated by a flywheel 8 on engine 1. As FIG. 2 shows, charging coil assembly 4 comprises four capacitor charging windings or coils 4a, 4b, 4c and 4d which are connected to effect selective charging of four primary capacitors CC1, CC2, CC3 and CC4 in ignition system 3. Coil 4b also serves as a high speed winding, as hereinafter explained. The primary capacitors in turn are dischargeable in response to operation of trigger coil assembly 5, which includes three trigger coils 5a, 5b and 5c, by means of discharge switches such as SCR1, which are actuated by pulse transformers such as PT1, through steering diodes such as SD1, across ignition coils such as IC1 to effect firing of the spark plugs S1 through S6 in proper sequence.

The frequency and timing of the electrical pulses from the coils 4a through 4d for charging the primary capacitors CC1 through CC4 are directly proportional to enging speed and the magnitude of these pulses is sufficient to provide power to charge the primary capacitors.

The frequency of the electrical pulses from trigger coil assembly 5 is six times the speed of the engine. For example, when engine 1 is running at 6,000 r.p.m., the crankshaft rotates at 100 revolutions per second and the pulse frequency from trigger coil assembly 5 is 600 cycles per second. The magnitude of the voltage (or voltage bias) of the electrical pulses from trigger coil assembly 5 is also proportional to engine speed and increases as engine speed increases. In ignition system 3, a higher bias voltage from trigger coil assembly 5 resulting from higher engine speed tends to cause advance in timing. Trigger coil assembly 5 in mechanically adjustable or positionable relative to rotatable magnet 6 to effect basic advance or retard of the spark, as during engine starting.

Figure 3:
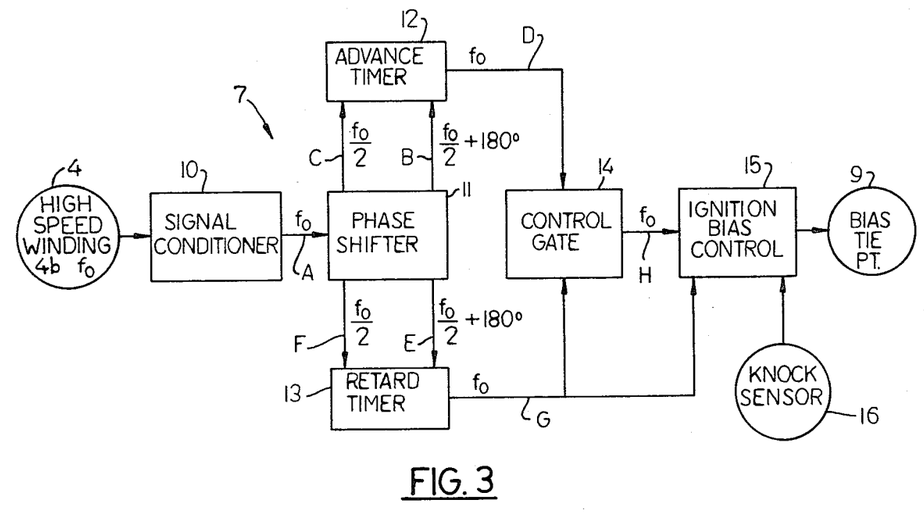
FIG. 3 is a schematic or block diagram of the controller shown in FIG. 2.

FIGS. 2 and 3 show, in schematic form, an ignition timing and detonation controller 7 in accordance with the invention for use in conjunction with the ignition system 3 hereinbefore described. Among other things, the controller 7, which is connected at a point 4A to high speed winding 4b of charging coil assembly 4 to receive operating power and signal information therefrom, provides a biasing voltage at a tie point 9 in circuit 3, the effect of which is to compensate or balance (i.e., reduce) the bias voltage supplied by trigger coil assembly 5 resulting from an increase in engine speed and thereby provides a taylored spark advance at increased engine speeds to reduce detonation and improves engine efficiency.

Figure 4:
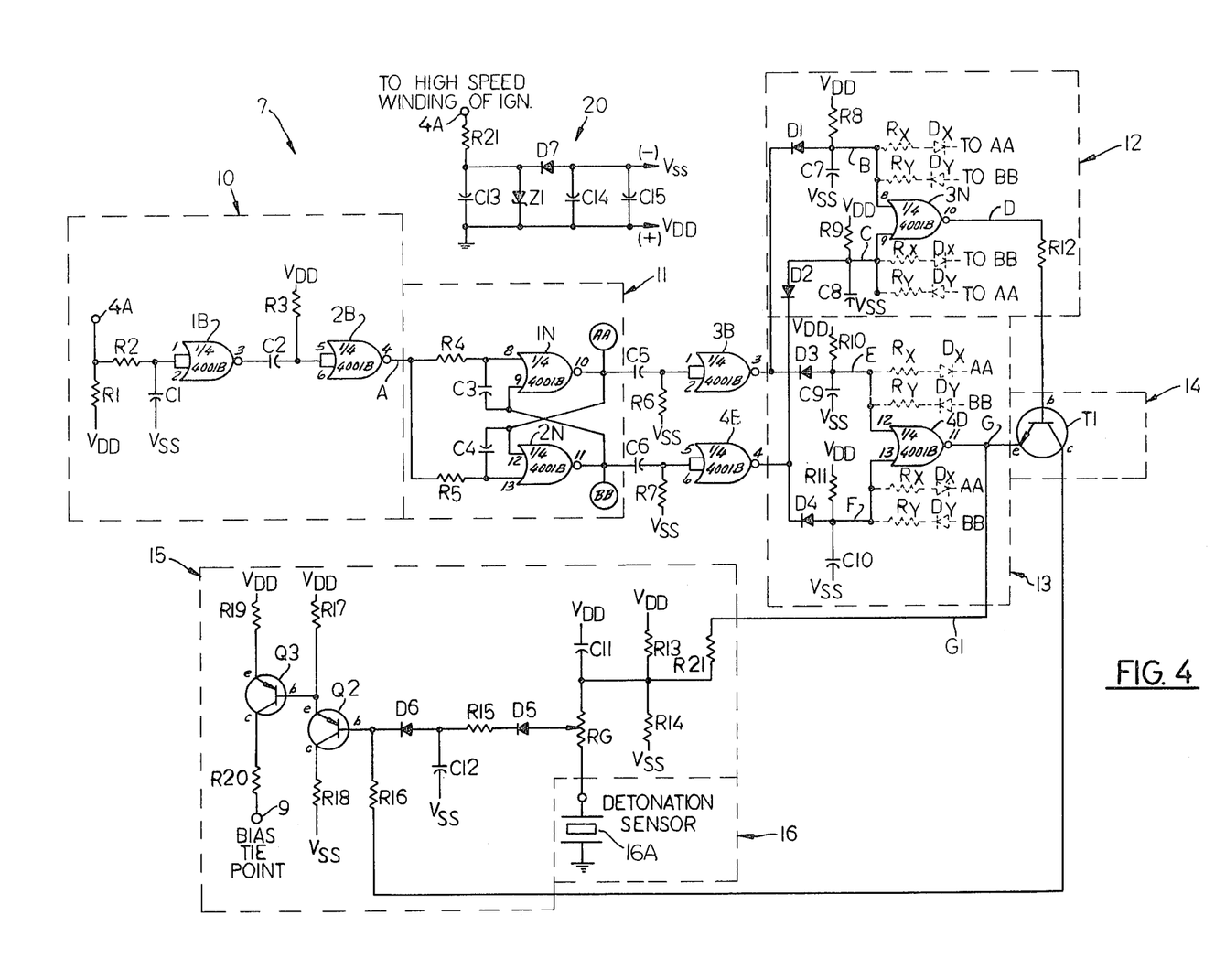
FIG. 4 is an electric circuit diagram of the controller shown in FIGS. 2 and 3.

It is to be noted that the electrical circuit diagrams in FIGS. 3 and 4 include eight points designated by the capital letters A, B, C, D, E, F, G, H. The nature and configuration of the electrical signals appearing at these points during operation of controller 7 is shown in the curves designated by the letters A through H in each of the FIGS. 5, 6 and 7.

Figure 5:
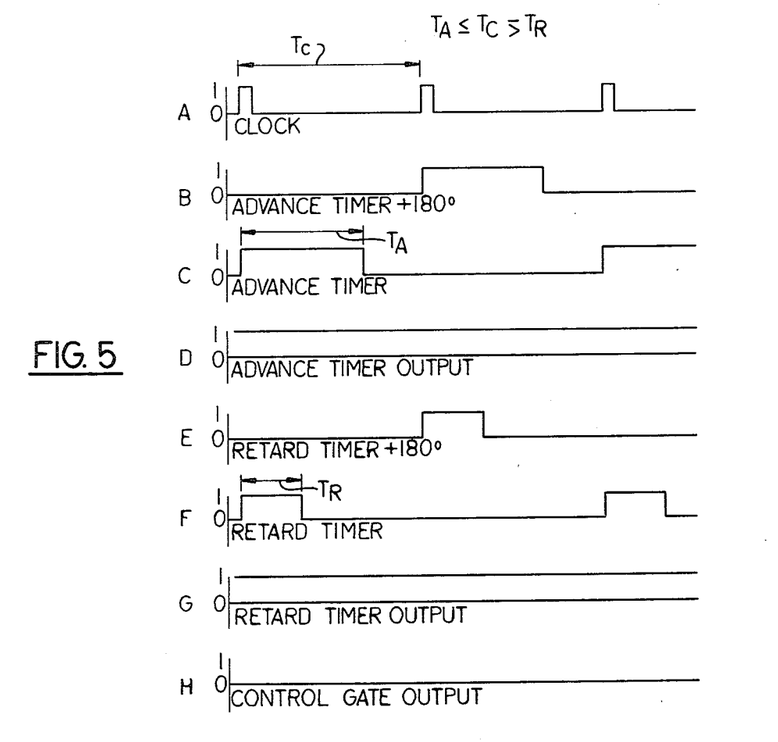
FIGS. 5, 6 and 7 each depict a family of curves showing electrical conditions at various points in the circuit of FIG. 4 under different engine operating conditions.

FIG. 5, for example, illustrates engine operation below a speed where additional spark advance is needed (i.e., 2,000 r.p.m., for example) wherein there is no overlap between the pulse widths of the pulse signals at points B and C in the advance timer circuit 12, and consequently, the signals at points D and G equal 1 and the output signal (point H) of control gate 14 is zero (0). The lines designated $T_A$ and $T_R$ in FIG. 5 represent the pulse widths of the respective signals. The line designating $T_C$ indicates clock signal frequency, which is relatively low in FIG. 5.

Figure 6:
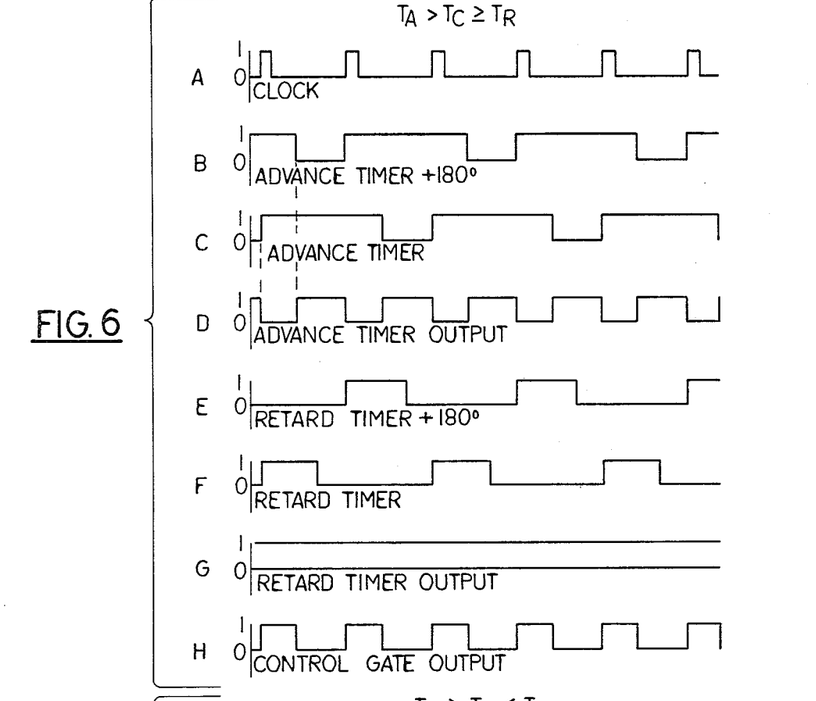

FIG. 6, for example, illustrates engine operation at a speed half-way between initiation of spark advance and maximum spark advance (i.e., above 2,000 r.p.m. for example) wherein there is overlap between the pulse signals at points B and C and, consequently, the signals at points D and H are inversely proportional and the output signal of control gate 14 (point H) is pulsed. The clock signal at point A is at medium frequency.

Figure 7:
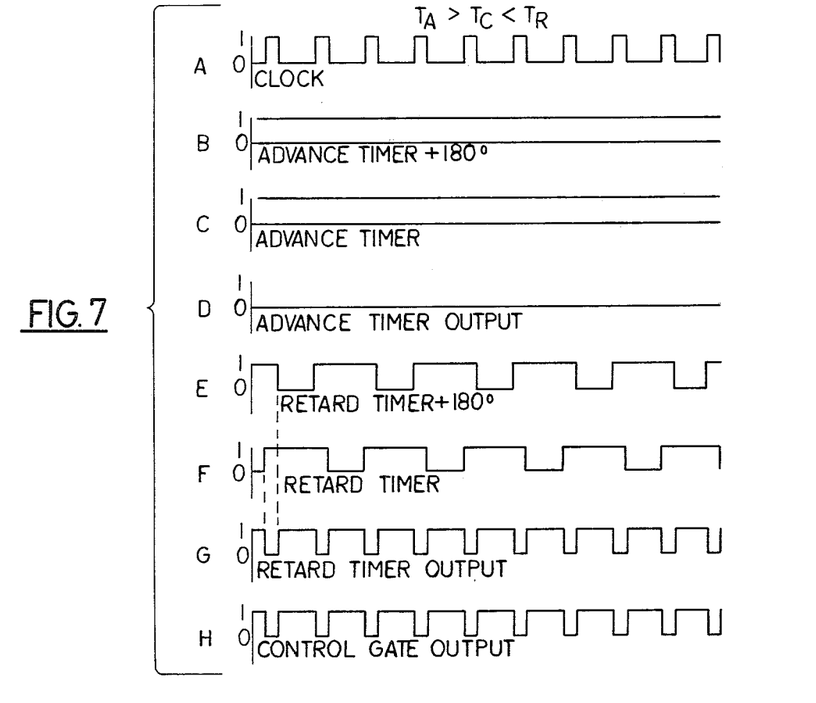

FIG. 7, for example, illustrates engine operation at full speed and spark advance is maximum (i.e., well above 2,000 r.p.m., for example) wherein there is overlap between the pulse signals at points E and F in the retard timer circuit 13, and, consequently, although the signal at point D is zero (full advance), the pulse signal at point G of the retard timer is pulsed and the output (point H) of control gate 14 is pulsed in the opposite direction of the clock. Note that the greatest spark advance will occur when the signal at point H is a steady 1.

As FIGS. 3 and 4 show, controller 7 generally comprises a signal conditioner circuit 10 for receiving and conditioning the electrical pulses from the high speed winding 4b; a phase shifter circuit 11 for processing output signals from the signal conditioner 10, an advance timer circuit 12 and a retard timer circuit 13, both of which receive output signals from the phase shifter circuit 11, a control gate 14 responsive to output signals from the advance and retard timer circuits 12 and 13, respectively, to operate an ignition bias control circuit 15 which provides a bias signal to tie point 9 to reduce the bias voltage otherwise provided by the trigger coil assembly 5, and a detonation (knock) sensing circuit 16 connected to the ignition bias control circuit 15 to modify the bias signal produced thereby to tie point 9. Controller 7 electrically provides additional spark advance for engine 1, the amount of advance being dependent upon engine speed and detonation severity, and thereby provides reduced detonation and improved engine efficiency while maintaining safe operation at higher speeds, especially in the case of large outboard motors.

Figure 8:
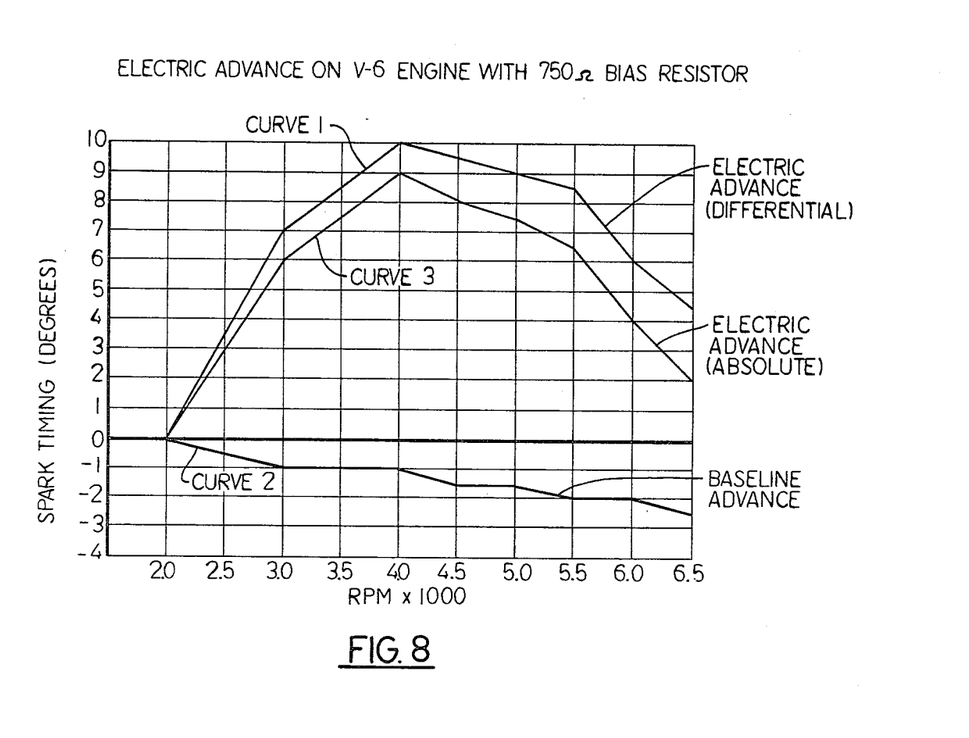
FIG. 8 is a graph wherein engine speed in r.p.m. is plotted against ignition timing in degrees and showing curves illustrative of ignition advance under different operating conditions.

As the graph in FIG. 8 makes clear, the spark advance timer circuit 12 is used to improve engine efficiency at cruising speed. The spark retard timer circuit 13 insures proper high speed operation of the ignition system and cooperates with the detonation sensing circuit 16. The two timer circuits 12 and 13 are triggered by a pulse representative of engine speed and supplied from the high speed winding 4b of engine 1. Spark advance is initiated when the duty cycle of the advance timer circuit 12 is equal to the period of the trigger signal from the high speed winding 4b. Spark advance will then be proportional to engine speed until the duty cycle of the advance timer circuit 12, is double the period of the trigger signal from the high speed winding 4b. At this time, maximum spark advance will be reached. A further increase in engine speed will produce no change in spark timing until the duty cycle of the retard timer circuit 13 is equal to the period of the trigger signal from the high speed winding 4b. From this point, an increase in engine speed will produce a proportional decrease in spark advance until the duty cycle of the retard timer circuit 13 is double that of the period of the trigger signal from the high speed winding 4b. The spark timing will now be back to where spark advance was initiated. A further increase in engine speed will produce no further change in spark timing.

The detonation sensing circuit 16 will proportionally reduce the spark advance towards the initial timing. The amount of reduction varies directly with the amplitude of the detonation. The detonation circuit 16 incorporates a smoothing filter to maintain proper timing and low detonation levels. In order to inhibit high speed noise from activating the detonation sensing circuit 16, a signal from the retard timer circuit 13 is fed into ignition bias circuit 15. This will gradually increase the threshold voltage needed to activate the detonation sensing circuit 16.

As FIG. 4 shows, controller 7 is provided with electrical power from a power supply circuit 20 which includes a resistor R21 and a capacitor C13 connected in series with each other between the high speed winding 4b and ground. A Zener diode Z1 is connected across capacitor C13 and parallel-connected filter capacitors C14 and C15 are connected across the Zener diode in series with a diode D7. Power supply circuit 20 has output terminals designated as negative terminal $V_{ss}$ and positive terminal $V_{dd}$ and these terminals are understood to be connected to correspondingly labelled connection points in FIG. 4.

It is to be noted that in the curves depicted in FIGS. 5, 6 and 7, logic "1" is equal to negative voltage at terminal $V_{ss}$ and logic "0" is equal to positive voltage at terminal $V_{dd}$ or ground.

As FIG. 4 further shows, signal conditioner circuit 10 comprises two buffers, 1B and 2B, in the form of NOR gates with inputs connected as shown so that output is on or off when both inputs are on or off, respectively. Buffer 1B conditions the pulse signal received from the high speed winding 4b so it makes a sharp transition when going into a half monostable circuit comprising a capacitor C2 and a resistor R3 and the output of this half monostable circuit is fed into buffer 2B. The output of buffer 2B appearing at point A is a short positive going pulse (see FIGS. 5, 6 and 7) which is fed into phase shifter circuit 11.

The phase shifter circuit 11 comprises a flip flop circuit made up of NOR gates 1N and 2N and two half monostable circuits. One half monostable circuit comprises capacitor C5 and resistor R6 and the other half monostable circuit comprises capacitor C6 and resistor R7. The output signals processed by the two half monostable circuits, are fed into buffers 3B and 4B, respectively, in the form of NOR gates connected as shown. The output signals of the buffers 3B and 4B appear at points designated B, E and C, F, respectively, and are negative going pulses. The pulses C and B are 180° out of phase with each other, as are the pulses E and F. The pulses C and B appearing at points B, C and E, F, respectively, are fed into the advance timer and the retard timer circuits 12 and 13, respectively.

The advance timer circuit 12 comprises two half monostable circuits (resistor R8, capacitor C7 and diode D1, and resistor R9, capacitor C8 and diode D2) which have the same decay time and feed into a NOR gate 3N and the output signal of NOR gate 3N appearing at point D is fed to the base terminal b of an NPN transistor T1 of control gate 14. As FIG. 8 shows, this gives maximum spark advance when the engine speed is twice the speed where advance is initiated.

As shown in dotted lines in FIG. 4, by adding circuits including a resistor Rx and a diode Dx, connectable to the point AA and BB, the decay time will increase with engine speed and this will give maximum spark advance when the engine speed is less than twice the speed where advance is initiated. If circuits including a resistor Ry and a diode Dy are substituted for the circuits comprising components Rx and Dx and connected to the point AA and DD, the decay time will decrease with engine speed and this will give maximum spark advance when the engine speed is greater than twice the speed where advance is initiated.

Under low r.p.m. conditions, such as when idling, the output signal at D of the advance timer circuit 12 is low (VSS). When the r.p.m. is sufficiently high enough, the duty cycles of the two monostable circuits will overlap as the curves B and C in FIG. 6 show. This overlapping period produces a high (VDD) output signal at point D from the buffer 3N.

The retard timer circuit 13 comprises two half monostable circuits (resistor R10, capacitor C9 and diode D3, and resistor R11, capacitor C10 and diode D4), which have the same decay time and feed into a NOR gate 4D. The output of NOR gate 4D appearing at point G is fed into the emitter terminal e of transistor T1 of control gate 14 and it is also fed by a conductor G1 into the ignition bias control circuit 15. As FIG. 8 shows, this gives maximum spark retard when the engine speed is twice the speed where retard is initiated.

As shown in dotted lines in FIG. 4, adding circuits including a resistor Rx and a diode Dx connectable to the points AA, the decay time will increase with engine speed and this will give maximum spark retard when the engine speed is less than twice the speed where retard is initiated. If circuits including a resistor Ry and a diode Dy are substituted for the circuits comprising components Rx and Dx and connected to point BB, the decay time will decrease with engine speed and this will give maximum spark retard when the engine speed is greater than twice the speed where retard is initiated.

Under low r.p.m. conditions, the output signal at point G from the NOR gate 4D is low (VSS). Under high r.p.m. conditions, the duty cycles of the two monostable circuits will overlap as the curves E and F in FIG. 7 show and the NOR gate 4D output appearing at point G will be high (VDD) during this overlapping period.

The control gate 14 comprises NPN transistor T1. Under low r.p.m. conditions, the emitter terminal e thereof is low (VSS) and the base terminal b of transistor T1 is low (VSS). When the base terminal b of transistor T1 is in a high (VDD) state, depending upon the speed of the engine, transistor T1 becomes conductive. At very high r.p.m., the base terminal b of transistor T1 will be in the high (VDD) state continuously but the emitter terminal e thereof will progressively be turned off by increasing r.p.m., thus turning off the transistor T1. The output signal of transistor T1 is fed into the ignition bias control circuit 15.

The ignition bias control circuit 15 comprises amplifier transistors Q2 and Q3 and it also contains a bias circuit including a capacitor C11 and resistors R13, R14, R21 and RG. Under low r.p.m. conditions and when no detonation is occuring, transistor T1 is off and transistors Q2 and Q3 are also turned off. Under higher r.p.m. conditions, the signal from the control gate 14 modulates transistors Q2 and Q3 into the on state. The amount of modulation will determine the bias on the output terminal or tie-point 9 of the controller 7. The greater the modulation, the lower the bias on tie-point 9 and the greater the advance of the ignition. Under very high r.p.m. conditions, modulation decreases progressively with rising engine speed thus raising the bias level at tie-point 9 and thus retarding the ignition timing of engine 1.

Ignition bias control circuit 15 also receives input signals from a detonation sensor circuit 16 which includes a detonation sensing device or transducer 16A, hereinafter described. Upon detonation, a detonation sensor 16 generates a signal that when sufficiently strong (i.e., of sufficient voltage magnitude) will conduct through diode D5 into integrator circuit comprising a resistor R15 and a capacitor C12. This signal then is coupled through a diode D6 into the base terminal b of transistor Q2. The higher the signal voltage level, the more the transistor Q2 is turned off, thus retarding the engine timing. At very high speeds, the output from NOR gate 4D in the retard timer circuit 13 produces an additional bias through the resistors R21, R13 and R14 onto capacitor C11 of the bias circuit. This bias will also cause a gradual off-setting in the sensitivity from the detonation sensor 16. Thus, as the engine speed increases in the very high range, the ambient mechanical noise from the engine 1 will not cause a premature retarding of the ignition.

Detonation transducer 16A, shown schematically in FIG. 4, is a known type of device which is used to pick up vibrations of engine 1 and convert them into electric output signals. Transducer 16A may, for example, take the form of a suitably housed quartz piezo-electric crystal which is attached, as by epoxy, onto a metal surface of engine 1 and may be mounted at various locations, such as on a cylinder head or intake manifold, or any other location whereat it detects detonation vibrations most consistently and does not amplify or reduce the vibration input from any one cylinder. One electrical terminal of transducer 16A is grounded and the other terminal is connected to bias control circuit 15. When engine 1 is not running, transducer 16A produces no output signal. When engine 1 is running at speeds whereat no (or low) detonation occurs, transducer 16A produces a relatively low voltage signal. When engine 1 is running at speeds whereat detonation magnitude (amplitude) is at or reaches a predetermined magnitude, a relatively high voltage output signal is produced.

I claim:

1. In an alternator driven capacitor discharge system for an internal combustion engine having capacitor means, and an alternator including first coil means for providing electrical pulses for charging said capacitor means, said electrical pulses having a frequency related to engine speed, and second coil means for providing a biasing signal for regulating the timing of the discharge of said capacitor means and tending to effect timing advance as engine speed increases, the improvement comprising:

means responsive to the frequency of said electrical pulses for modifying said biasing signal so as to effect additional timing advance when engine speed exceeds a predetermined speed, said means responsive to the frequency of said electrical pulses including advance timer means which operates to effect timing advance in proportion to the increase in engine speed above said predetermined speed until a second predetermined speed is reached, and retard timer means which operates to effect a reduction in timing advance in proportion to the increase in engine speed above said second predetermined speed until engine speed returns to said second predetermined speed;

and means responsive to engine detonation for further modifying said biasing signal so as to effect a reduction of said additional timing advance when detonation exceeds a predetermined level.

2. A system according to claim 1 wherein said advance timer means and said retard timer means each include a monostable multivibrator which provides a pulsed output signal having a predetermined pulse width, and wherein said advance timer means effects timing advance when the period of said pulses from said first coil means equals said predetermined pulse width and until said period reaches half said predetermined pulse width, and wherein said retard timer means effects timing retard when the period of said pulses from said first coil means equals said predetermined pulse width and until said period reaches half said predetermined pulse width.

3. In an alternator drive capacitor discharge system for an internal combustion engine having capacitor means, and an alternator including first coil means for providing electrical pulses for charging said capacitor means, said electrical pulses having a frequency related to engine speed, and second coil means for providing a biasing signal for regulating the timing of the discharge of said capacitor means and tending to effect timing advance as engine speed increases, the improvement comprising:

means responsive to the frequency of said electrical pulses for modifying said biasing signal so as to effect additional timing advance when engine speed exceeds a predetermined speed, said means responsive to the frequency of said electrical pulses including a phase-shifting circuit for providing phase-shifted signals based on said pulses, an advance timer circuit and a retard timer circuit for receiving said phase-shifted signals and for providing timer output signals based therein, a control gate circuit for receiving said timer output signals and for providing a gate signal based thereon, and an ignition bias control circuit for receiving said gate signal and a timer output signal from said retard timer and for providing a bias control signal for modifying said biasing signal;

and means responsive to engine detonation for further modifying said biasing signal so as to effect a reduction of said additional timing advance when detonation exceeds a predetermined level.

4. A system according to claim 3 wherein said means responsive to engine detonation provides a detonation signal to said ignition bias control circuit to modify said bias control signal therefrom.

5. A system according to claim 4 wherein said detonation signal reduces said bias control signal in proportion to increases in engine detonation.

6. A system according to claim 5 wherein said means responsive to engine detonation is further responsive to the timer output signal of said retard timer circuit so that said detonation signal must increase in value in order to effect reduction of spark advance, thereby preventing high speed engine noise from effecting production of a spurious detonation signal by said means responsive to engine detonation.

7. In an alternator driven capacitor discharge system for an internal combustion engine having capacitor means, and an alternator including first coil means for providing electrical pulses for charging said capacitor means, said electrical pulses having a frequency related to engine speed, and second coil means for providing a biasing signal to a first timing circuit for regulating the timing of the discharge of said capacitor means and tending to effect timing advance as engine speed increases, the improvement comprising:

first means responsive to the frequency of said electrical pulses from said first coil means to provide a bias voltage to said first timing circuit to modify said biasing signal so as to effect additional timing advance when engine speed exceeds a predetermined speed;

and second means responsive to engine detonation for providing a control signal to modify said bias voltage so as to effect a reduction of said additional timing advance when detonation exceeds a predetermined level; said first means comprising:

an ignition bias control circuit for applying said bias voltage to said first timing circuit, a phase shifter circuit for receiving said electrical pulses from said first coil means and for providing a pair of phase-shifted pulsed signals;

an advance timer circuit and a retard timer circuit for operating said ignition bias control circuit, each advance and retard timer circuit including a monostable multivibrator, and each advance and retard timer circuit receiving said pair of phase-shifted pulsed signals, each advance and retard timer circuit providing timer output signals for operating said ignition bias control circuit to cause the latter to advance or retard timing, said advance timer circuit operating to initiate an advance timer output signal in proportion to engine speed increase when the period of said electrical pulses from said first coil means equals the pulse width of the signals of said advance monostable multivibrator and until said period reaches half said pulse width and maximum spark advance occurs;

said retard timer circuit operating to initiate a retard timer output signal in proportion to further engine speed increase when the period of said electrical pulses from said first coil means equals the pulse width of the signals of said retard monostable multivibrator and until said period reaches half said pulse width and spark advance has returned to its initial starting point;

said second means comprising:

a detonation sensing circuit for providing said control signal to said ignition bias control circuit for reducing said bias voltage from said ignition bias control circuit in proportion to increases in engine detonation sensed thereby;

said detonation sensing circuit being responsive to the timer output signal of said retard timer circuit so that said control signal must increase in value in order to effect reduction of spark advance, thereby preventing high speed noise of said engine from effecting production of a spurious control signal by said detonation sensing circuit.

8. An ignition timing and detonation controller for use in an alternator driven capacitor discharge system for an internal combustion engine which comprises capacitor means, and an alternator including first coil means for providing electrical pulses for charging said capacitor means, said pulses having a frequency related to engine speed, and second coil means for providing a bias signal for regulating the timing of the discharge of said capacitor means, said biasing signal tending to effect timing advance as engine speed increases; said controller comprising:

a spark advance circuit;

and a detonation sensing circuit;

said spark advance circuit comprising a spark advance timer to improve engine efficiency at cruising speed and a retard timer to insure proper high speed operation of said ignition system and said detonation sensing circuit; said timers being triggered by a trigger pulse representative of engine speed; said controller operating so that spark advance is initiated when the duty cycle of said advance timer is equal to the period of said trigger pulse; said spark advance remaining proportional to engine speed until the duty cycle of said advance timer is double the period of said trigger pulse, whereupon maximum spark advance is reached; said controller further operating so that further increase in engine speed produces no change in spark timing until the duty cycle of said retard timer is equal to the period of said trigger pulse, whereupon an increase in engine speed produces a proportional decrease in spark advance until the duty cycle of said retard timer is double that of the period of the trigger pulse whereupon spark timing is back to where spark advance was initiated and a further increase in engine speed produces no further change in spark timing;

said detonation sensing circuit operating to proportionally reduce the spark advance towards the initial timing in direct proportion to the amplitude of detonation.

9. A controller according to claim 8 wherein said detonation sensing circuit is connected to receive a signal from said spark advance circuit to gradually increase the threshold voltage needed to activate said detonation circuit and thereby inhibit high speed engine noise from actuating said detonation circuit.

10. A controller according to claim 9 wherein said detonation circuit is connected to receive said signal from said retard timer.

* * * * *